US006591526B1

(12) United States Patent
Garrett

(10) Patent No.: US 6,591,526 B1
(45) Date of Patent: Jul. 15, 2003

(54) AUDIO-CAPABLE PHOTO ALBUM

(76) Inventor: Charles A. Garrett, 728 Kelly Mill Rd., Six Mile, SC (US) 29682

(*) Notice: Subject to any disclaimer, the term of this patent is extended or adjusted under 35 U.S.C. 154(b) by 0 days.

(21) Appl. No.: 10/173,275

(22) Filed: Jun. 18, 2002

(51) Int. Cl.[7] .............................. B09B 5/00; A47G 1/06

(52) U.S. Cl. ............................. 40/455; 40/717; 40/457; 434/317

(58) Field of Search .......................... 40/717, 455, 457; 434/317

(56) References Cited

U.S. PATENT DOCUMENTS 2,304,980 A 12/1942 Williams et al.
2,465,616 A 3/1949 Sziklai
D182,105 S 2/1958 Chase
2,850,294 A 9/1958 Ortis et al.
D238,111 S 12/1975 Shyers
4,004,689 A 1/1977 Glasell
D272,546 S 2/1984 Holson
4,434,567 A 3/1984 LeVeau
4,541,188 A 9/1985 Sadorus
5,182,872 A 2/1993 Lee et al.
5,359,374 A 10/1994 Schwartz
5,365,686 A 11/1994 Scott
5,499,465 A 3/1996 Manico
5,504,836 A 4/1996 Loudermilk
5,520,544 A * 5/1996 Manico et al. .............. 434/317
5,533,290 A 7/1996 Lee et al.
D382,900 S 8/1997 Wyant
5,954,514 A * 9/1999 Haas et al. ................. 434/317
6,185,851 B1 * 2/2001 Loudermilk et al. ........ 434/317
6,421,524 B1 * 7/2002 Padgett ....................... 434/317

FOREIGN PATENT DOCUMENTS

CA 2275785 A1 * 12/2000 ............ G09B/5/00

OTHER PUBLICATIONS

"8 to 16 minute Voice Record/Playback System With Integrated CODEC, I5216 Series," Winbond Electronics Corp. Nov. 30, 2001 (1 page).
"Single–Chip Voice Record/Playback Device 4–, 5–, 6–, and 8–minute Durations, ISD5008, ISD, a Winbond Company," Aug., 2000 (2 pages).
"VP1000A QuikVoice Sound Chip," Eletech Elrctronics, Inc. (1 page).
Data Sheet entitled, "SV4000A QuikVoice Sound Board," Eletech Elrctronics, Inc. (2 pp.).

* cited by examiner

*Primary Examiner*—Cassandra H. Davis
(74) *Attorney, Agent, or Firm*—Donald R. Schoonover

(57) ABSTRACT

A photo album includes a CPU that records audio and control buttons located adjacent to each of a plurality of photograph-accommodating pockets on leaves of the photo album. A microphone unit is used to record audio sound bites for each photograph stored in the album and a control button is pressed to activate a playback circuit, which includes a speaker on the album, to play back the audio recorded for the selected photograph.

10 Claims, 5 Drawing Sheets

AUDIO-CAPABLE PHOTO ALBUM

BACKGROUND OF THE INVENTION

1. Field of the Invention

The present invention relates to the general art of stationery and books, and to the particular field of photo albums.

2. Discussion of the Related Art

With recent advances in photography, including digital cameras, numerous varieties of film cameras, and the like, photography has become a huge industry which continues to grow. Photographs and the handling of such photographs are concomitant with the photography industry.

At the present time, many photographs are stored in boxes, containers and the like. Some photographs are placed in photo albums. Therefore, there are many examples of containers and albums that are used to store photographs.

One problem with the storage of photographs is the proper identification of such photographs. Nearly everyone has come across a photograph and wondered who the people in the photograph are, where the photograph was taken, and so forth.

Some containers and albums presently available have space for someone to write details about a photograph. This can be in the form of cards or spaces on an album leaf. Some people also write on the photograph itself.

These procedures have several drawbacks. For example, many areas designated for such information are simply not large enough to adequately describe a photograph. Still further, once information is written into the area provided, it may be difficult, if not impossible, to change that information at a later time. Also, if information is written directly onto a photograph, there is a chance that the photograph will be damaged.

Yet another drawback to presently-available methods of providing identifying information for photographs is that these methods are not interactive. That is, it is difficult for a later viewer to add information to the information presented for a particular photograph. Still further, if a person is, for some reason, unable to read and write that person cannot add information to the photograph description. This is common if the subject of the photograph is an infant.

Still further, it is nearly impossible to add the dimension of another sense to the photograph. This drawback is explained by the inability of a photograph, which is strictly a visible item, to convey a sense of sound associated with a scene. Again, this can be understood by considering a photograph of a baby. This photograph would have much more meaning if the baby's voice could be captured with the photograph. A photograph, by itself, cannot do this. Thus, if someone were taking a picture of children to be sent to grandparents, it would be very helpful to the total enjoyment of the photographs if the children's voices could also be heard for each photograph. Presently-available photo albums cannot fully fulfill this need.

Even beyond the use of photographs for pure enjoyment, using photographs of industrial items can benefit by the addition of audio descriptions. For example, steps used in the assembly of a particular item could be shown in photographs of the assembly at each stage of the assembly with an audio description of the next step accompanying this photograph or of any special instructions associated with the item at that stage of assembly. Written descriptions simply cannot fully convey the description in a manner similar to this combination of media.

While some picture frames have voice recording capabilities, these capabilities are quite limited. Also, while some children's books have audio capabilities, such capabilities are quite limited. Neither of these items has characteristics that overcome the above-discussed drawbacks.

PRINCIPAL OBJECTS OF THE INVENTION

It is a main object of the present invention to provide an improved photo album.

It is another object of the present invention to provide a photo album in which special messages for each photograph in the album can easily be included.

It is another object of the present invention to provide a photo album in which special messages for a photograph can easily be amended.

It is another object of the present invention to provide a photo album in which special messages associated with a photograph can be made by someone who cannot read or write.

It is another object of the present invention to provide a photo album in which messages associated with a photograph can be interactive with each viewer.

It is another object of the present invention to provide a photo album which can be used to include special instructions associated with items shown in the photographs stored in the album.

It is another object of the present invention to provide a photo album in which messages associated with photographs in the album can be recorded under controlled conditions.

SUMMARY OF THE INVENTION

These, and other, objects are achieved by a photo album that includes a voice recording system that can associate a special voice message with each photograph stored in the album. The voice message can be recorded, re-recorded, erased and played back by using control buttons in the system. Buttons are located adjacent to each photograph storing pocket and each button is connected to one of a plurality of memory circuits in a CPU associated with the album. Pressing a button adjacent to a particular photograph activates a playback system and any audible message associated with the photograph will be played back over a speaker that is mounted on the album. Recording of messages or sounds is effected using a microphone which has record, review and erase modes. The system is set up so that recording can only occur when the microphone is used so recorded messages cannot be accidentally damaged or erased. A special passcode circuit can also be included to further ensure that accidental or unwanted changes to a recorded message can be prevented.

Using the album of the present invention permits special messages or sounds to be recorded in connection with each photograph. In this manner, a photograph can be brought to life by the addition of an audio presentation that is associated with each photograph. Amendment of the recorded message permits additional information to be added and interactive viewing is made possible thereby.

Another example of an industrial use of the album embodying the present invention includes an inventory of items, with special instructions associated with each item being included. Thus, if a homeowner takes photographs of possessions for insurance purposes, these photographs can be supplemented by adding audio messages to each photograph, such as directing attention to a particular area of a photograph that might otherwise be overlooked.

DETAILED DESCRIPTION OF THE INVENTION

Figure 1:
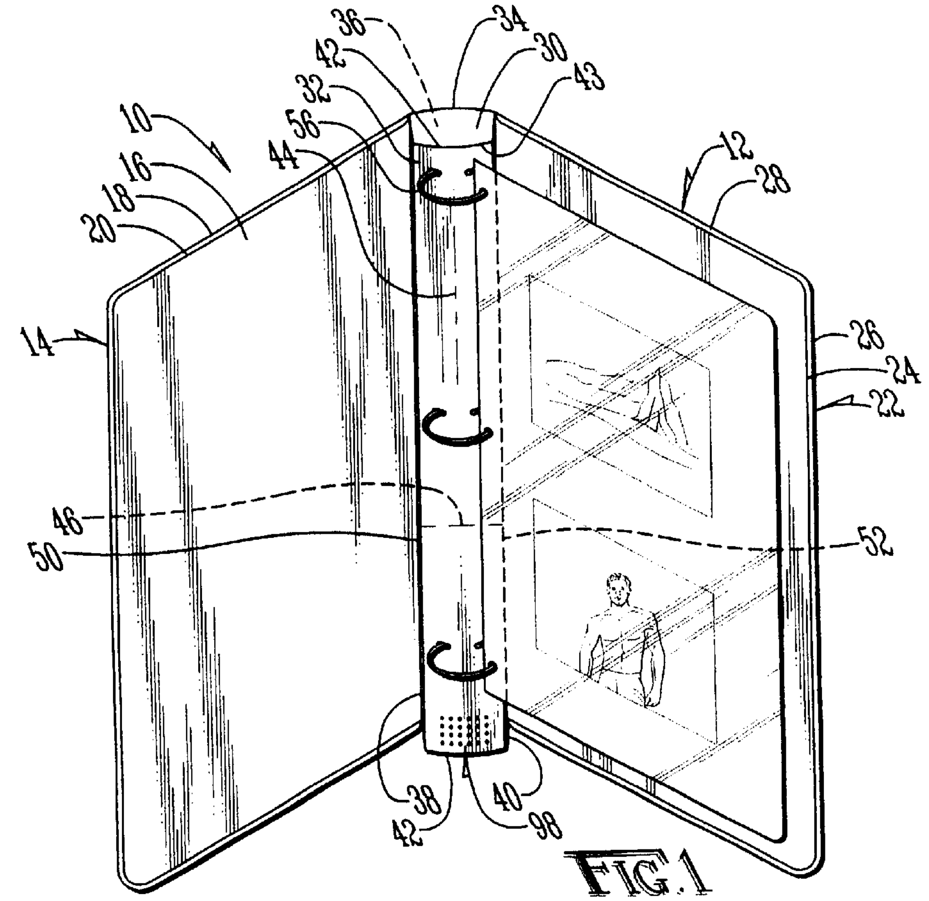
FIG. 1 is a perspective view of a photo album embodying the present invention.

Other objects, features and advantages of the invention will become apparent from a consideration of the following detailed description and the accompanying drawings.

The photo album embodying the present invention includes audible recording capabilities that permit special messages and sounds to be recorded and amended for each photograph in the album. However, lockout circuits can also be included to prevent inadvertent or undesired message erasure or amendment.

Referring to the accompanying figures, it can be understood that the present invention is embodied in a photo album 10 comprising a binder unit 12 which includes a front cover 14 having an inside layer 16 and an outside layer 18 and a pocket 20 defined between inside layer 16 and outside layer 18, a rear cover 22 having an inside layer 24 and an outside layer 26 and a pocket 28 defined between inside layer 24 and outside layer 26. The covers and layers can be formed of any suitable materials, including plastics, cloth or the like.

Binder unit 12 further includes a spine 30 having an inside layer 32 and an outside layer 34 and a pocket 36 defined between inside layer 32 and outside layer 34 of spine 30, a first side edge 38, a second side edge 40, a first end edge 42, a second end edge 43, a longitudinal axis 44 extending between the first end edge 42 of the spine 30 and the second end edge of the spine, and a transverse axis 46 extending between the first side edge 43 of the spine 30 and the second side edge 40 of the spine 30. A first joint 50 connects the front cover 14 to the first side edge 38 of the spine 30 and a second joint 52 connects the rear cover 22 to the second side edge 40 of the spine 30.

A plurality of binder unit rings, such as binder unit ring 56, are mounted on the inside layer 32 of the spine 30. The binder unit rings 56 are spaced apart from each other along the longitudinal axis 44 of the spine 30.

Figure 8:
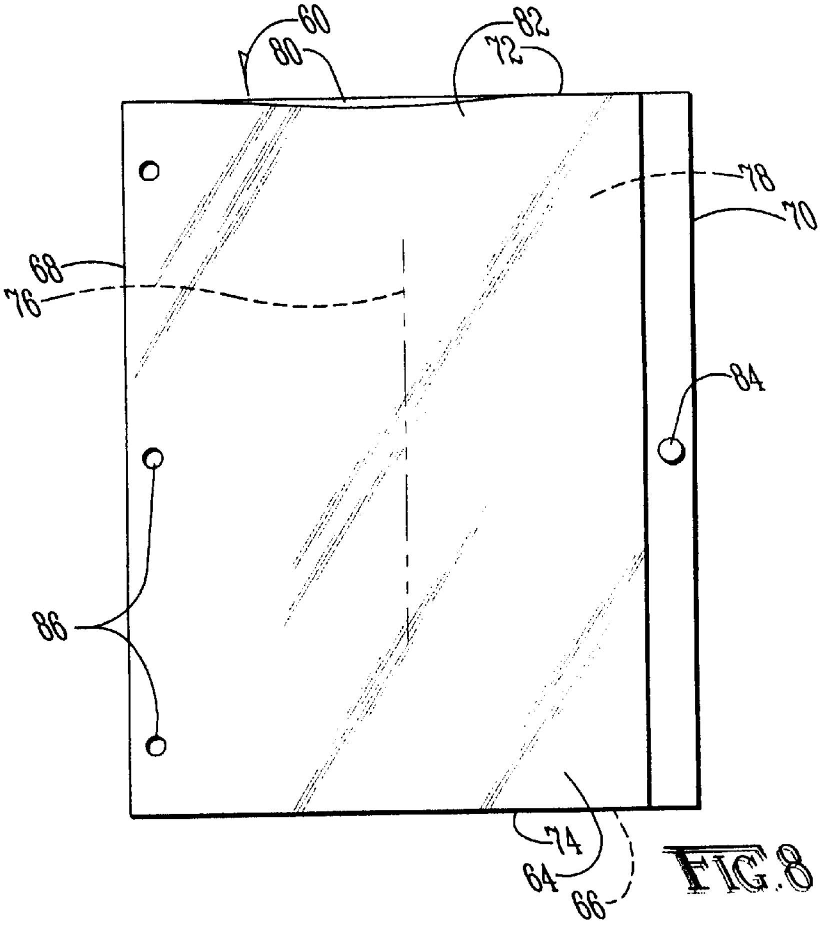
FIG. 8 is a plan view of a binder unit page, or leaf, that can be included in the photo album embodying the present invention.
Figure 9:
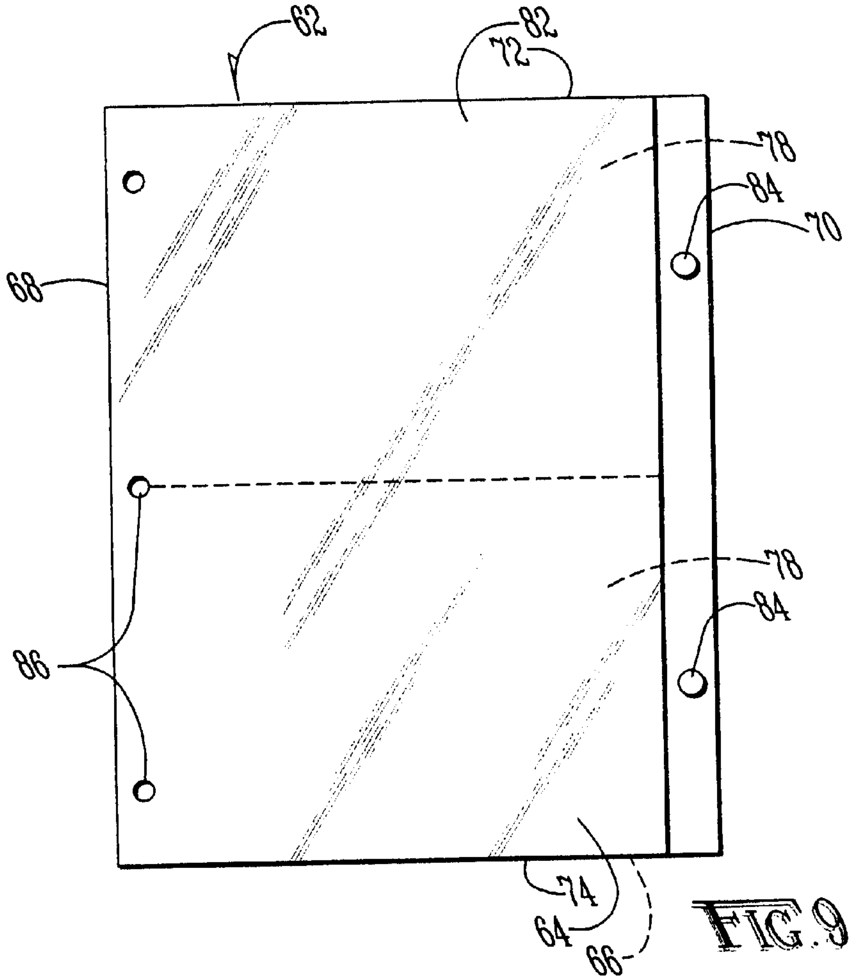
FIG. 9 is a plan view of another binder unit leaf that can be included in the photo album embodying the present invention.
Figure 10:
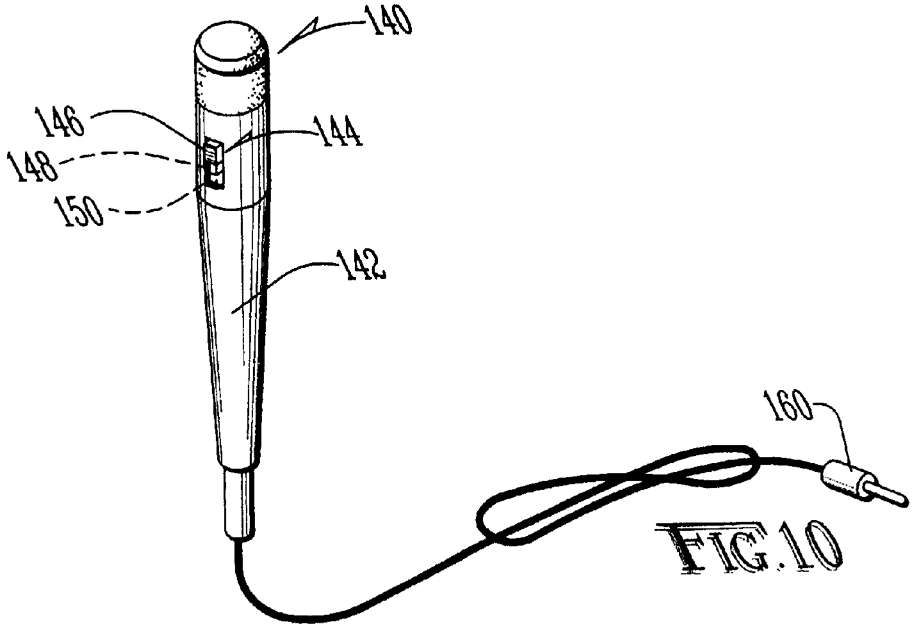
FIG. 10 shows a microphone unit included in the photo album of the present invention.

Binder unit 12 further includes a plurality of binder unit pages or leaves, such as leaves 60 and 62 shown in FIGS. 8 and 9 respectively, attached to the binder unit rings 56. Each binder unit leaf includes a front layer 64, a rear layer 66, a first side edge 68, a second side edge 70, a first end edge 72, a second end edge 74, and a longitudinal axis 76 extending between the first end edge 72 of the binder unit leaf 60, 62 and the second end edge 74 of the binder unit leaf 60, 62. A photo pocket 78 is located between the front layer 64 of the binder unit leaf 60, 62 and the rear layer 66 of the binder unit leaf 60, 62, with leaf 60 having a single pocket and leaf 62 having a plurality of pockets. Each pocket 78 has an access opening, such as access opening 80 on pocket 78, defined therein and at least one transparent layer, such as layer 82 that will be in covering relationship with a photograph stored in the pocket 78. A control button, such as control button 84, is located on each binder leaf 60, 62 adjacent to an associated photo pocket 78 and corresponding to the photo pocket 78 adjacent thereto. Each control button 84 has an "on" position and an "off" position. The control buttons 84 can be a snap type that snaps into an "on" position when depressed and then snaps back into an "off" position after completion of the recorded message after pressure is released.

Each binder unit leaf 60, 62 further includes a plurality of binder unit ring accommodating holes, such as hole 86, defined through the binder unit leaf 60, 62 in positions to accommodate binder unit rings 56 when the binder unit leaf 60, 62 is attached to the binder unit 12.

The binder unit 12 further includes a microphone connection jack 90 on the second end edge 43 of the spine 30, a battery compartment 92 in the pocket 36 of the spine 30, with the battery compartment 92 including an access door 94. A speaker compartment 96 is located in the pocket 36 of the spine 30 and has speaker holes 98 defined through the inside layer 32 of the spine 30. The speaker compartment 96 is spaced apart from the battery compartment 92 along the longitudinal axis 44 of the spine 30. A speaker 100 is located in the speaker compartment 96.

Figure 11:
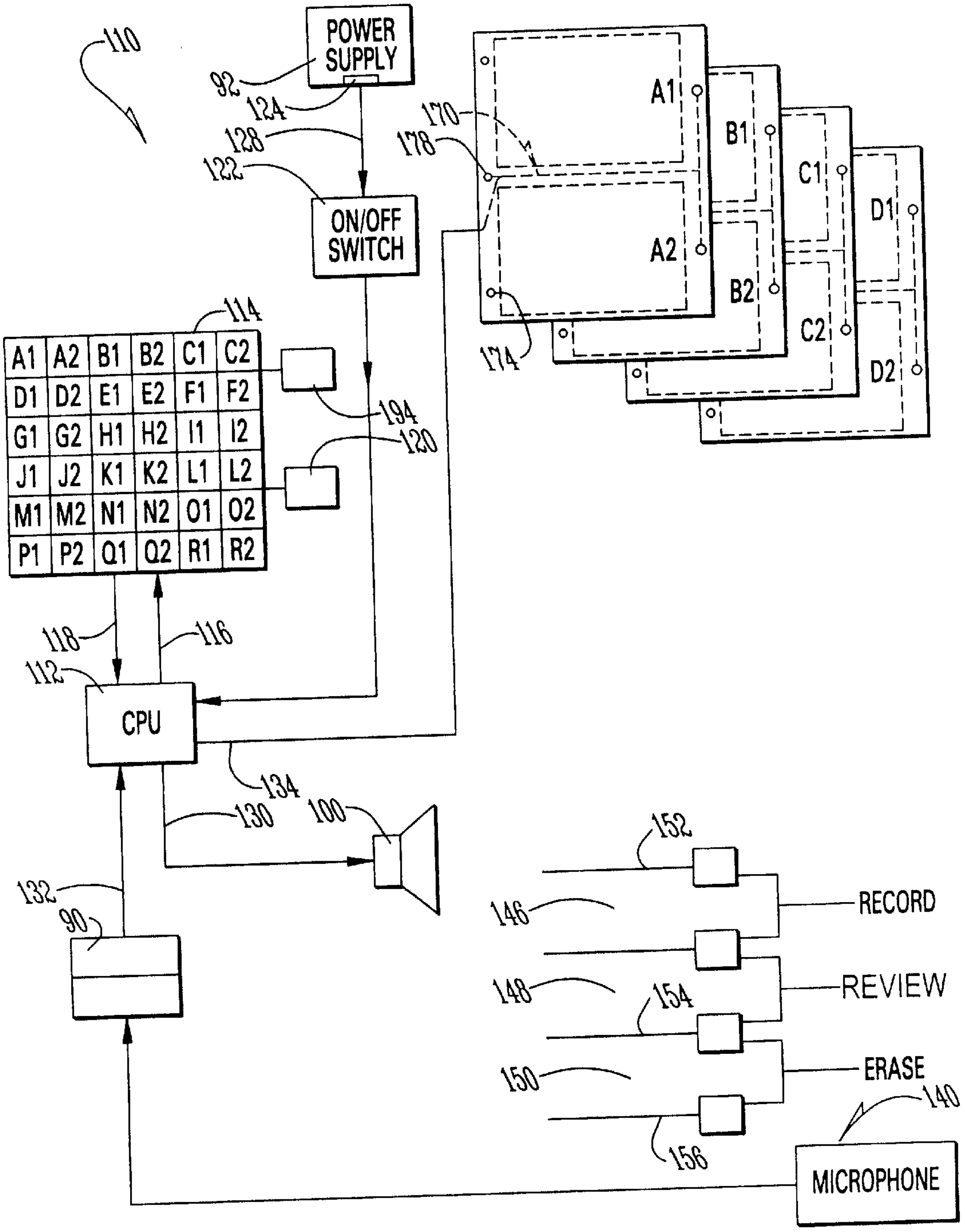
FIG. 11 is a circuit diagram of the circuitry used in the photo album of the present invention.

Photo album 10 further includes control circuitry 110 in the binder unit 12. Control circuitry 110 is shown in FIG. 11 and includes a CPU 112 which is located in the pocket of either the front cover 14 or the rear cover 22 of the binder unit 12. The CPU 112 can be similar to the device sold as "QuickVoice" by Eletech Electronics, Inc of Industry, CA and described in a paper titled "SV4000A, 6-Message Voice Recorder Board", or the device known as ChipCorder I5216 Series sold by Winbond Electronics Corp. and described in a Winbond Electronics Corp publication released Nov. 30, 2001 as Revision A1, or the device sold as the ISD5008 ChipCorder also sold by Winbond, or the "QuickVoice Sound Chip" also sold by Eletech, with the descriptions of these devices being incorporated herein by reference. The CPU includes a plurality of memory circuits, such as memory circuit 114, with each memory circuit 114 being associated with a selected control button 84 on one of the plurality of binder leaves 60, 62. The memory circuits 114 are partitioned. CPU 112 further includes a record circuit 116 which is connected to each of the memory circuits 114 and which is designed to record information in a selected memory circuit 114, a playback circuit 118 which is connected to each of the memory circuits 114 and which is designed to playback information stored in a selected memory circuit 114, an erase circuit 120 which is connected to each of the memory circuits 114 and which is designed to erase information stored in a selected memory circuit 114. A memory circuit 114 is selected by moving a selected control button 84 on a binder leaf 60, 62 into the "on" configuration.

An on/off switch 122 in the binder unit 12 is movable between an "on" position and an "off" position, and a first electrical connection 124 between the battery compartment 92 and the on/off switch 122 electrically connects a battery 126 in the battery compartment 92 when the battery 126 is in place in the battery compartment 92. The control circuitry 110 further includes a second electrical connection 128 between the battery compartment 92 and the CPU 112 with on/off switch 122 electrically interposed between the battery compartment 92 and the CPU 112 to act as a system controlling switch which turns the entire system "on" and "off".

Circuit 110 further includes a third electrical connection 130 between the CPU 112 and the speaker 100, a fourth electrical connection 132 between electrical microphone jack 90 on the binder unit 12 and the CPU 112, and a fifth electrical connection 134 between the control button 84 on each binder unit leaf 60, 62 and the CPU 112.

The photo album 10 further includes a microphone unit 140 which can be either stand-up or hand-held as suitable. Microphone unit 140 includes a housing 142, and a mode switch 144 which is movably mounted on the housing 142 to be movable between a record position 146, a review or playback position 148, and an erase position 150. A record electrical connection 152 is connected to the mode switch 144 at the record position 146, a review or playback electrical connection 154 is connected to the mode switch 144 at the playback position 148, and an erase electrical connection 156 is connected to the mode switch 144 at the erase position 150. The microphone unit 140 further includes a microphone plug 160 connected to the record electrical connection 152 and to the playback electrical connection 154 and to the erase electrical connection 156.

Record electrical connection 152 is electrically connected to the record circuit 116 in the CPU 112 when the microphone plug 160 of the microphone unit 140 is electrically connected to the microphone connection jack 90 of the binder unit 12 and is electrically connected to one memory circuit B1 of the plurality of memory circuits of the CPU 112 when the mode switch 144 of the microphone unit 140 is in the record position 146 and on/off switch 122 in the binder unit 12 is in the "on" position and a selected control button B1 on one of the binder unit leaves 60, 62 is in the "on" position. The one memory circuit B1 being selected to receive information via the microphone unit 140 when the one memory circuit is activated, the information received by the one memory circuit B1 corresponding to the photo pocket adjacent to the selected control button B1.

Review electrical connection 154 is electrically connected to the playback circuit 118 in the CPU 112 when the microphone plug 160 of the microphone unit 140 is electrically connected to the microphone connection jack 90 of the binder unit 12 and is electrically connected to the one memory circuit B1 of the plurality of memory circuits of the CPU 112 when the mode switch 144 of the microphone unit 140 is in the review position 148 and the on/off switch 122 in the binder unit 12 is in the "on" position and the selected control button B1 on one of the binder unit leaves 60, 62 is in the "on" position, the one memory circuit B1 being selected to play back information via the speaker 100 when the one memory circuit is activated via the review electrical connection 154, the information played back by the one memory circuit corresponds to the photo pocket adjacent to the selected control button B1.

Erase electrical connection 156 is electrically connected to the erase circuit in the CPU 112 when the microphone plug 160 of the microphone unit 140 is electrically connected to the microphone connection jack 90 of the binder unit 12 and is electrically connected to the one memory circuit B1 of the plurality of memory circuits of the CPU 112 when the mode switch 144 of the microphone unit 140 is in the erase position 150 and the on/off switch 122 in the binder unit 12 is in the "on" position and the selected control button B1 on one of the binder unit leaves 60, 62 is in the "on" position. The information erased from the one memory circuit B1 corresponds to the photo pocket adjacent to the selected control button B1.

Recording, review, erase and/or playback can all be stopped by moving a control button to the "off" position, or by moving the on/off switch 122 to the "off" position, or by moving the mode switch 144 out of a selected mode position during record, review or erase processes.

Other control buttons are operated in a similar fashion and are indicated by corresponding identifications in the memory circuit.

Fifth electrical connection 134 electrically connects the control buttons 84 on the binder unit leaves 60, 62 to the CPU 112 and activate the playback circuit in the CPU 112 for a particular memory circuit, such as memory circuit C2, of the CPU 112 when a particular control button, such as control button C2 is moved to the "on" position and the on/off switch 122 in the binder unit is in the "on" position. When the particular control button is activated, information from the particular memory circuit is played over the speaker 100 and corresponds to the photo pocket adjacent to the particular control button.

Figure 6:
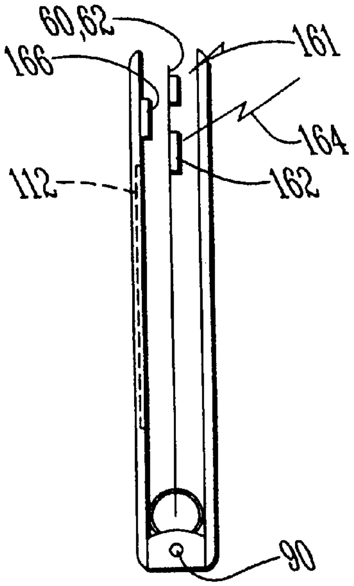
FIG. 6 is an end elevational view of another form of photo album embodying the present invention.

In one form of the photo album of the present invention, the fifth electrical connection 134 includes an over-the-air connection 161 as indicated in FIG. 6. The over-the-air connection 161 includes a transmitter 162 electrically connected to the control button on each binder unit leaf 60, 62 and which generates a signal 164 when the control button is moved into the "on" position and a receiver 166 connected to the CPU 112 and receiving the signal 164 generated by the transmitter 162.

Figure 7:
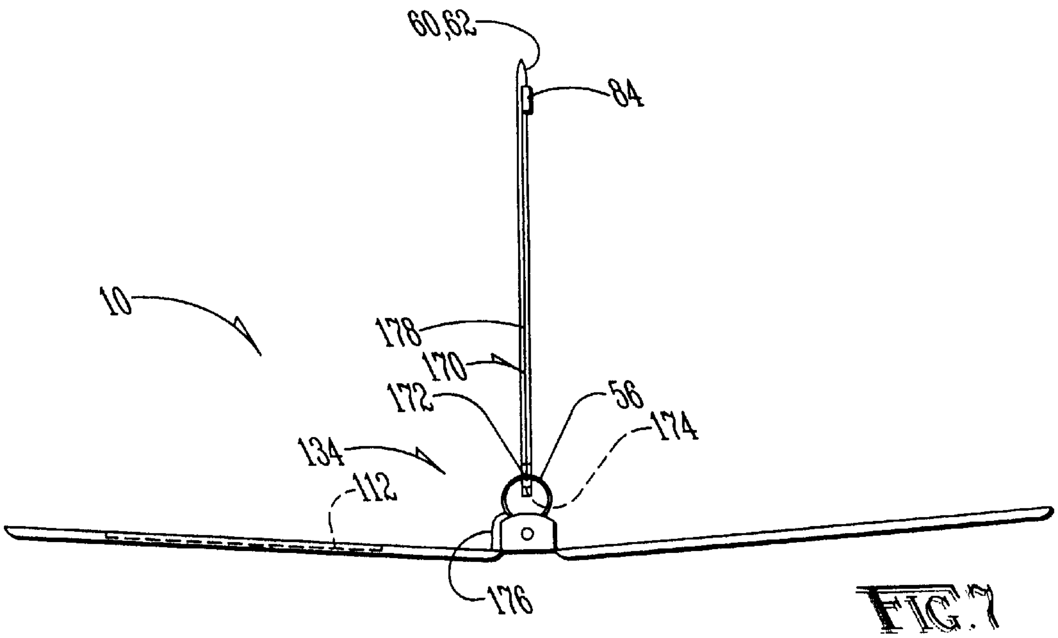
FIG. 7 is an end view of the album shown in FIG. 7.

In yet another form of the photo album 10 of the present invention, the fifth electrical connection 134 includes electrical connectors, such as electrical connector 170 shown in FIG. 11, which connect the control buttons to the CPU 112. In such an embodiment, the photo album 10 includes an electrical connection, such as a flat wire connection similar to that used internally in computers, or a ring contact 172, shown in FIG. 7, on at least one of the binder unit rings 56, with the fifth electrical connection 134 between the control button 84 on each binder unit leaf 60, 62 and the CPU 112 including the ring contact 172, a sliding element 174 (see FIG. 11) on each binder unit leaf 60, 62 and slidably connected to the ring contact 172, a sixth electrical connection 176 between the ring contact 172 and the CPU 112, and a seventh electrical connection 178 between the sliding element 174 and the control button 84 on the binder unit leaf 60, 62. It is noted that the wired connection is shown in FIG. 11, however, the over-the-air connection 161 can also be used in connection with the circuit shown in FIG. 11 without departing from the scope of this disclosure.

Figure 2:
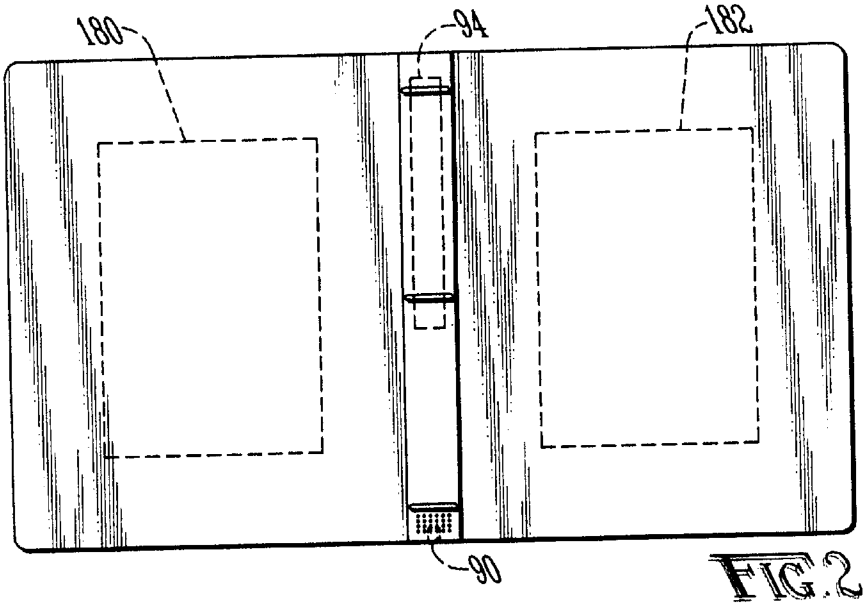
FIG. 2 shows another form of the photo album embodying the present invention.
Figure 3:
FIG. 3 is an elevational view showing the outside of a spine of a closed album of the present invention.
Figure 4:
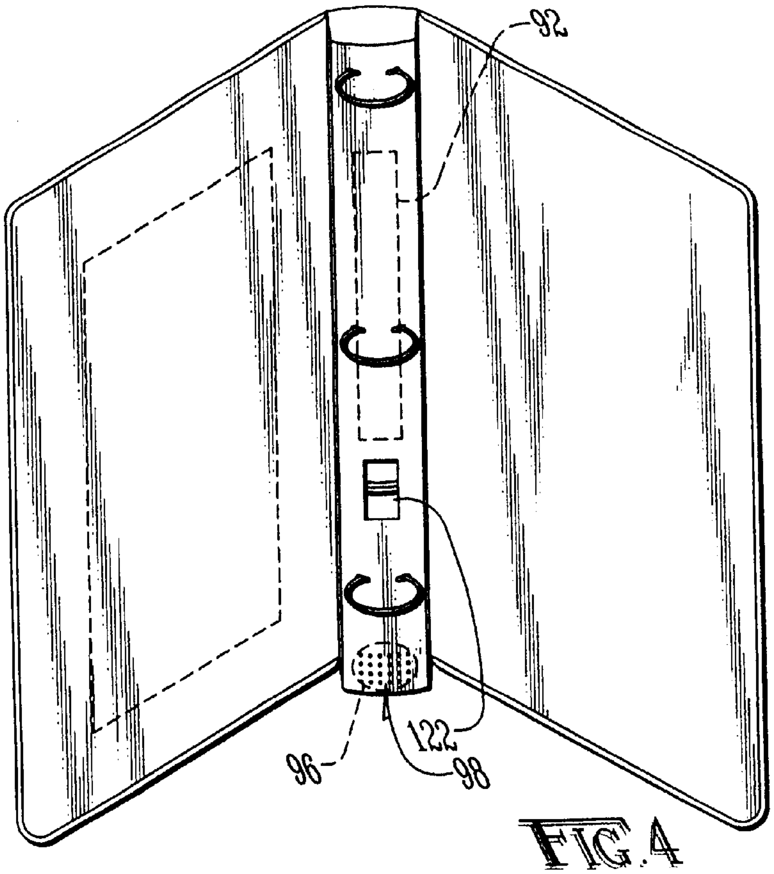
FIG. 4 is a perspective view of a photo album embodying the present invention.
Figure 5:
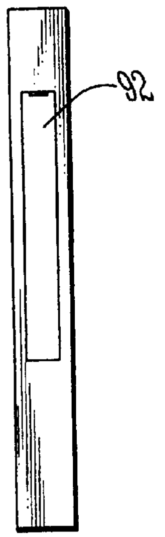
FIG. 5 is an elevational view of the album shown in FIG. 4.

Yet another form of the photo album 10 embodying the present invention is indicated in FIG. 2 and includes a portion 180 of the control circuitry 110 located in the pocket 20 of the front cover 14 and another portion 182 of the control circuitry 110 located in the pocket 28 in the rear cover 22.

In order to ensure that information stored in the memory of the CPU 112 is not accidentally damaged or destroyed, information can only be recorded into the memory using the microphone unit 140. Otherwise, only playback is permitted using the control buttons. However, to further ensure that information in the memory of the CPU 112 is not accidentally damaged or destroyed, the CPU 112 can include a passcode controlled circuit 194 that is connected to the record circuit of the CPU 112 and which must be activated to activate the record circuit of the CPU 112.

The photo album 10 embodying the present invention can be of any size, any color and any material. The leaves of the photo album can also be formed in any suitable manner, including having stiff paper, such as cardboard or the like, in the pockets to separate a front photograph from another photograph in the rear of the pocket. It is to be understood some applications of the present invention may provide front pockets only. The CPU can be designed to contain any amount of recorded information, such as ten to fifteen seconds or more, as desired. Furthermore, the memory of the CPU is of the type that retains information even when no power is applied to the CPU. The preferred form of the rings of the photo album is a permanently closed type; however, other forms of rings can also be used.

It is understood that while certain forms of the present invention have been illustrated and described herein, it is not to be limited to the specific forms or arrangements of parts described and shown.

I claim:

1. A photo album comprising:

a) a binder unit which includes (1) a front cover having an inside layer and an outside layer and a pocket defined between the inside layer of the front cover and the outside layer of the front cover, (2) a rear cover having an inside layer and an outside layer and a pocket defined between the inside layer of the rear cover and the outside layer of the rear cover, (3) a spine having an inside layer and an outside layer and a pocket defined between the inside layer of the spine and the outside layer of the spine, a first side edge, a second side edge, a first end edge, a second end edge, a longitudinal axis extending between the first end edge of the spine and the second end edge of the spine, and a transverse axis extending between the first side edge of the spine and the second side edge of the spine, (4) a first joint connecting the front cover to the first side edge of the spine, (5) a second joint connecting the rear cover to the second side edge of the spine, (6) a plurality of binder unit rings mounted on the inside layer of the spine, the binder unit rings being spaced apart from each other along the longitudinal axis of the spine, (7) a plurality of binder unit leaves attached to the binder unit rings, each binder unit leaf including (A) a front layer, (B) a rear layer, (C) a first side edge, (D) a second side edge, (E) a first end edge, (F) a second end edge, (G) a longitudinal axis extending between the first end edge of the binder unit leaf and the second end edge of the binder unit leaf, (H) a photo pocket located between the front layer of the binder unit leaf and the rear layer of the binder unit leaf, the pocket having an access opening defined therein and at least one transparent layer, (I) a control button on the binder leaf adjacent to the photo pocket and corresponding to the photo pocket adjacent thereto, the control button having an “on” position and an “off” position, and (J) a plurality of binder unit ring accommodating holes defined through the binder unit leaf in positions to accommodate binder unit rings when the binder unit leaf is attached to said binder unit, (8) a microphone connection jack on the second end edge of the spine, (9) a battery compartment in the pocket of the spine, the battery compartment including an access door,

(10) a speaker compartment in the pocket of the spine, the speaker compartment having speaker holes defined through the inside layer of the spine and being spaced apart from the battery compartment along the longitudinal axis of the spine, and

(11) a speaker in the speaker compartment;

b) control circuitry in said binder unit and which includes (1) a CPU in the pocket of one cover of the front cover and the rear cover of said binder unit, said CPU including (A) a plurality of memory circuits, each memory circuit being associated with a selected control button on one of the plurality of binder leaves, (B) a record circuit which is connected to each of the memory circuits and which is designed to record information in a selected memory circuit, (C) a playback circuit which is connected to each of the memory circuits and which is designed to playback information stored in a selected memory circuit, (D) an erase circuit which is connected to each of the memory circuits and which is designed to erase information stored in a selected memory circuit, and (E) a memory circuit being selected by moving a selected control button on a binder leaf into the “on” configuration, (2) an on/off switch in the binder unit, the on/off switch in the binder unit being movable between an “on” position and an “off” position, (3) a first electrical connection between the battery compartment and the on/off switch, a battery being electrically connected to the battery compartment when the battery is in place in the battery compartment, (4) a second electrical connection between the battery compartment and the CPU, (5) a third electrical connection between the CPU and the speaker, (6) a fourth electrical connection between the electrical microphone jack on said binder unit and the CPU, and (7) a fifth electrical connection between the control button on each binder unit leaf and the CPU;

c) a microphone unit which includes (1) a housing, (2) a mode switch, the mode switch being movably mounted on the housing and being movable between a record position, a review position and an erase position, (3) a record electrical connection connected to the mode switch at the record position, (4) a review electrical connection connected to the mode switch at the playback position, (5) an erase electrical connection connected to the mode switch at the erase position, (6) a microphone plug connected to the record electrical connection and to the playback electrical connection and to the erase electrical connection, (7) the record electrical connection being electrically connected to the record circuit in the CPU when the microphone plug of the microphone unit is electrically connected to the microphone connection jack of said binder unit and is electrically connected to one memory circuit of the plurality of memory circuits of the CPU when the mode switch of said microphone unit is in the record position and the on/off switch in the binder unit is in the "on" position and a selected control button on one of the binder unit leaves is in the "on" position, the one memory circuit being selected to receive information via the microphone unit when the one memory circuit is activated, the information received by the one memory circuit corresponding to the photo pocket adjacent to the selected control button, (8) the review electrical connection being electrically connected to the playback circuit in the CPU when the microphone plug of the microphone unit is electrically connected to the microphone connection jack of said binder unit and is electrically connected to the one memory circuit of the plurality of memory circuits of the CPU when the mode switch of said microphone unit is in the review position and the on/off switch in the binder unit is in the "on" position and the selected control button on one of the binder unit leaves is in the "on" position, the one memory circuit being selected to play back information via the speaker when the one memory circuit is activated via the review electrical connection, the information played back by the one memory circuit corresponding to the photo pocket adjacent to the selected control button, (9) the erase electrical connection being electrically connected to the erase circuit in the CPU when the microphone plug of the microphone unit is electrically connected to the microphone connection jack of said binder unit and is electrically connected to the one memory circuit of the plurality of memory circuits of the CPU when the mode switch of said microphone unit is in the erase position and the on/off switch in the binder unit is in the "on" position and the selected control button on one of the binder unit leaves is in the "on" position, the information erased from the one memory circuit corresponding to the photo pocket adjacent to the selected control button,

(10) the fifth electrical connection electrically connecting the control buttons on the binder unit leaves to the CPU and activating the playback circuit in the CPU for a particular memory circuit of the CPU when a particular control button is moved to the "on" position and the on/off switch in the binder unit is in the "on" position, with information from the particular memory circuit being played over the speaker and corresponding to the photo pocket adjacent to the particular control button.

2. The photo album as described in claim 1 wherein the fifth electrical connection includes an over-the-air connection, and further including a transmitter electrically connected to the control button on each binder unit leaf and which generates a signal when the control button is moved into the "on" position, and a receiver connected to the CPU and receiving a signal generated by the transmitter.

3. The photo album as described in claim 1 wherein each binder unit leaf includes a plurality of photo pockets and a plurality of control buttons, with each photo pocket having a control button associated therewith.

4. The photo album as described in claim 1 wherein a portion of said control circuitry is located in the pocket of the front cover and another portion of the control circuitry is located in the pocket in the rear cover.

5. The photo album as described in claim 1 wherein said microphone unit is hand held.

6. The photo album as described in claim 1 wherein the memory circuits of the CPU are partitioned.

7. The photo album as described in claim 1 further including a flat wire connected to at least one of the binder unit rings, the fifth electrical connection between the control button on each binder unit leaf and the CPU including (1) said flat wire, (2) a sliding element on each binder unit leaf and slidably connected to said flat wire, (3) a sixth electrical connection between said flat wire and the CPU, and (4) a seventh electrical connection between the sliding element and the control button on the binder unit leaf.

8. The photo album as described in claim 1 wherein each pocket of the binder unit leaf is transparent.

9. The photo album as described in claim 1 wherein the CPU includes a passcode controlled circuit that is connected to the record circuit of the CPU and which must be activated to activate the record circuit of the CPU.

10. A photo album comprising:

a) a binder unit which includes a plurality of leaves and a plug in jack;

b) each leaf of said plurality of leaves including a photograph pocket and an on/off button adjacent to the photograph pocket;

c) a recording and playback circuit in said binder unit and which includes a plurality of audio memory circuits, and a speaker in said binder unit;

d) a microphone unit which includes a plug for attachment to the plug in jack of said binder unit, a mode switch having a record mode, a review mode and an erase mode;

e) a circuit connecting each on/off button to said recording and playback circuit and activating a particular playback portion of the recording and playback circuit associated with a particular on/off button being moved into an "on" configuration to play anything recorded in the particular playback portion of the recording and playback circuit; and f) another circuit connecting the microphone unit to the recording and playback circuit to record, review and erase information from a selected portion of said recording and playback circuit when said mode switch is in a selected mode and a selected on/off button is in the "on" configuration.

* * * * *